United States Patent
Du et al.

(10) Patent No.: US 10,574,553 B2
(45) Date of Patent: Feb. 25, 2020

(54) FAULT ISOLATION FOR A CONTROLLER AREA NETWORK

(71) Applicant: GM GLOBAL TECHNOLOGY OPERATIONS LLC, Detroit, MI (US)

(72) Inventors: Xinyu Du, Oakland Township, MI (US); Shengbing Jiang, Rochester Hills, MI (US); Qi Zhang, Sterling Heights, MI (US); Aaron B. Bloom, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 332 days.

(21) Appl. No.: 15/620,140

(22) Filed: Jun. 12, 2017

(65) Prior Publication Data

US 2018/0359167 A1 Dec. 13, 2018

(51) Int. Cl.
| | | |
|---|---|---|
| *H04L 12/26* | (2006.01) | |
| *B60T 8/17* | (2006.01) | |
| *B60T 8/88* | (2006.01) | |
| *B60T 17/22* | (2006.01) | |
| *B60T 8/00* | (2006.01) | |
| *B60T 7/12* | (2006.01) | |
| *G07C 5/08* | (2006.01) | |
| *H04L 29/08* | (2006.01) | |

(52) U.S. Cl.
CPC ............ *H04L 43/0823* (2013.01); *B60T 7/12* (2013.01); *B60T 8/00* (2013.01); *B60T 8/17* (2013.01); *B60T 8/885* (2013.01); *B60T 17/221* (2013.01); *G07C 5/0808* (2013.01); *B60T 2270/402* (2013.01); *B60T 2270/406* (2013.01); *H04L 67/12* (2013.01)

(58) Field of Classification Search
CPC ... H04L 43/0823; H04L 67/12; G07C 5/0808; B60T 7/12
See application file for complete search history.

(56) References Cited

U.S. PATENT DOCUMENTS

| | | | |
|---|---|---|---|
| 9,678,131 B2* | 6/2017 | Jiang | G06F 11/0739 |
| 2014/0129748 A1* | 5/2014 | Muth | G06F 13/4072 |
| | | | 710/106 |
| 2017/0235698 A1* | 8/2017 | van der Maas | G06F 11/0745 |
| | | | 710/106 |

* cited by examiner

*Primary Examiner* — Elias Desta
(74) *Attorney, Agent, or Firm* — Lorenz & Kopf, LLP

(57) ABSTRACT

Methods and systems are provided for evaluating a CAN that includes a CAN bus and a plurality of modules configured to communicate over the CAN bus. A voltage sensor may be provided in electrical communication with the CAN bus. A number (N) of pairs of voltages may be read. Each pair may include a CAN high (CAN-H) value and a CAN low (CAN-L) value. The N pair of voltages may be processed through a comparison of the CAN-H values and the CAN-L values. Whether a fault signature is present in the CAN-H and CAN-L values may be determined from the processing.

20 Claims, 7 Drawing Sheets

FAULT ISOLATION FOR A CONTROLLER AREA NETWORK

INTRODUCTION

The present disclosure generally relates to a controller area network, and more particularly relates to methods and systems for providing fault isolation in a controller area network.

Vehicles, such as automobiles, may include a controller area network (CAN), through which modules, computers, electronic control units (ECUs), sensors, actuators, and other electronic elements, may communicate with each other through a common network bus. Any number of devices may be connected with the CAN bus at nodes. The CAN allows devices to send and receive data for processing, and enables checking for other information. These communications are useful and so it may be desirable to provide ways to isolate faults in the CAN should they occur. One technique of diagnosing a fault, involves unplugging individual modules from the CAN bus and checking them one at a time, until the fault is found.

Accordingly, it is desirable to provide improved techniques for fault isolation in a CAN. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method involves evaluating a CAN that includes a CAN bus and a plurality of modules configured to communicate over the CAN bus. A voltage sensor may be provided in electrical communication with the CAN bus. A number (N) of pairs of voltages may be read. Each pair may include a CAN high (CAN-H) value and a CAN low (CAN-L) value. The N pair of voltages may be processed through a comparison of the CAN-H values and the CAN-L values. Whether a fault signature is present in the CAN-H and CAN-L values may be determined from the processing.

In accordance with another exemplary embodiment a method is provided for evaluating a CAN. The CAN may include a CAN bus and a plurality of modules configured to communicate over the CAN bus. A fault signature indicative of a connection error in the CAN may be determined. A voltage sensor may be provided in electrical communication with the CAN bus. N pairs of voltages may be read from the CAN bus, each pair comprising a CAN-H value and a CAN-L value. The N pairs of voltages may be evaluated through a comparison of the CAN-H values and the CAN-L values. Whether the fault signature is present in the CAN-H and CAN-L values may be determined from the processing.

In accordance with a further exemplary embodiment, a method is provided for evaluating a CAN of a vehicle. The CAN may include a CAN bus and a plurality of modules configured to communicate over the CAN bus. The modules may be configured to control functions of the vehicle. A determination may be made as to whether a fault exists in the CAN. A fault signature indicative of a connection error in the CAN may be determined. A voltage sensor may be provided in electrical communication with the CAN bus. N pair of voltages may be read from the CAN bus, each pair including a CAN high (CAN-H) value and a CAN low (CAN-L) value. The N pair of voltages may be processed through a comparison of the CAN-H values and the CAN-L values. The processing determines whether the fault signature is present in the CAN-H and CAN-L values. When the fault signature is present, the fault may be isolated based on the fault signature.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure, the application, or uses thereof. Furthermore, there is no intention to be bound by any theory presented in the preceding background or the following detailed description.

Figure 1:
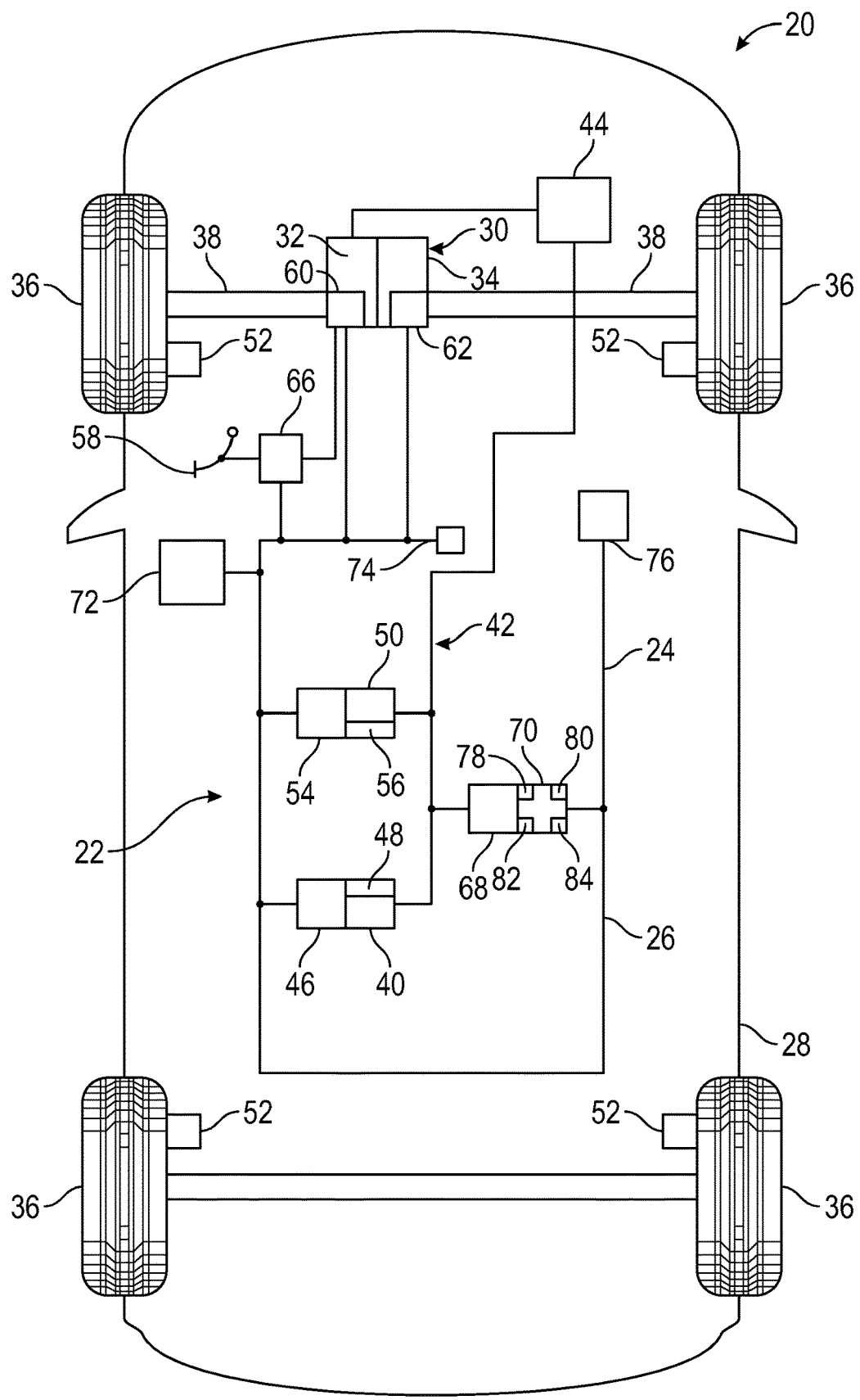
FIG. 1 is a functional block diagram of a vehicle that includes a CAN, in accordance with an exemplary embodiment.

FIG. 1 illustrates a machine that uses a number of electronic controllers. In some embodiments the machine may be any of an air, land or sea vehicle, an industrial plant, or any application where CAN is in use. In the current embodiment the machine is a vehicle 20 or automobile. The vehicle 20 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). In addition, in certain embodiments, the vehicle 20 may comprise any one of a number of other types of vehicles.

As described in greater detail further below, the vehicle 20 includes a CAN 22 for communication with and between various devices connected in the network. Specifically, as discussed further below, the CAN includes a CAN bus 24, which includes conductors 26 providing a circuit through which various devices communicate. In the depicted embodiment, the CAN 22 includes a number of nodes at which various devices are connected to the CAN bus 24. In various embodiments, the CAN 22 performs or is used to perform, various steps as set forth further below in connection with the processes 200 and 300 of FIGS. 4 and 7.

As depicted in FIG. 1, the vehicle 20 includes, in addition to the above-referenced CAN 22, a body 28, a propulsion system 30 with an engine 32 and a transmission 34, and wheels 36. The wheels 36 are each rotationally coupled near a respective corner of the body 28. The propulsion system 30 may provide torque to one or more of the wheels 36 to propel the vehicle 20, such as through drive shafts 38. In various embodiments the vehicle 20 may differ from that depicted in FIG. 1. For example, in certain embodiments the number of wheels 36 may vary. By way of additional example, in various embodiments the vehicle 20 may not have an engine 32, and for example may be powered by an electric motor, among various other possible differences.

In the exemplary embodiment illustrated in FIG. 1, the vehicle 20 may include a steering system 40. The steering system 40 is mounted to the body 28, and controls steering of the wheels 36. The steering system 40 may be supplied with power through a power bus 42, which may be connected with a battery 44. A steering control module (SCM), 46 may be communicatively coupled with and configured to control the steering system 40. The SCM 46 may be connected with the CAN bus 24 for communication therethrough. The steering system 40 may include a steering wheel and a steering column (not depicted). In certain embodiments, the vehicle 20 may be configured as an autonomous vehicle and may utilize steering commands that are generated by a computer, with no involvement from a driver. Under autonomous control, steering may be effected through an actuator 48 of the steering system 40, which is configured to control turning of the wheels 36.

The vehicle 20 may have a braking system 50 that is mounted on the body 28, and provides braking of the vehicle 20. The braking system 50 receives inputs from the driver via a brake pedal (not depicted), and provides appropriate braking via brake units 52, which may be located at each wheel 36. A brake control module 54 may be communicatively coupled with and configured to control the braking system 50. The BCM 54 may be connected with the CAN bus 24 for communication therethrough. Similar to the discussion above regarding possible variations for the vehicle 20, in certain embodiments, braking may be commanded by a computer instead of by a driver. In autonomous control, braking may be effected by an actuator 56 of the braking system 50 that may be communicatively coupled with the brake units 52.

A driver may also provide inputs via an accelerator pedal 58 to effect a desired speed or acceleration of the vehicle 20 by initialing a response from the propulsion system 30. An engine control module (ECM), 60 may be communicatively coupled with and configured to control the engine 32. The ECM 60 may be connected with the CAN bus 24 for communication therethrough. Similarly, a transmission control module (TCM), 62 may be communicatively coupled with and configured to control the transmission 34. The TCM 62 may be connected with the CAN bus 24 for communication therethrough. Similar to the discussion above regarding possible variations for the vehicle 20, in certain embodiments acceleration may be commanded by a computer instead of by a driver. In autonomous control, acceleration may be effected by an actuator 66 that may be communicatively coupled with the propulsion system 30.

The vehicle 20 may have any number of additional systems 68 to provide functions of the vehicle 20. A control module 70 may be communicatively coupled with and configured to control the additional system, or a number of the additional systems 68. The control module 70 may be connected with the CAN bus 24 for communication therethrough. Each of the modules connected with the CAN bus 24 may have the capability to send and receive signals over the CAN bus 24. Each module has a unique address on the CAN 22. This enables a module to receive inputs and data for its functions, but not for other functions intended for other modules. When an individual module sends information over the CAN 22, the information may be coded so that other modules recognize the source of the signal.

The vehicle 20 may include an on-board diagnostics data link connector (DLC) 72, which may be included on the body 28. The DLC 72 may be connected with the CAN bus 24 for communication therethrough. The vehicle 20 may be serviced by connecting a diagnostic tool with the DLC connector 72, which may provide information such as self diagnostic information for the systems connected to the CAN 22, including data as to whether various vehicle components require, or are about to require, information or servicing. For example, a standardized series of diagnostic codes may be used to provide information on functioning of the systems, to assist in repairing or replacing components. The DLC connector 72 provides a point to receive information from the controllers connected to the CAN bus 24. The CAN bus 24 may have ends 74 and 76 configured as described below.

As depicted in FIG. 1, control module 70 is used as an example to illustrate that the modules on the CAN bus 24 may each include any of a processor 78, memory 80, interface 82, or storage device 84. An individual module may omit any of the forgoing elements when not needed, or may rely on other control modules or computers to provide various information or functions, and may communicate therewith over the CAN bus 24. The processor 78 performs the computation and control functions of the respective control module, and may comprise any type of processor or multiple processors, single integrated circuits such as a microprocessor, or any suitable number of integrated circuit devices and/or circuit boards working in cooperation to accomplish the functions of a processing unit. During operation, the processor 78 executes one or more programs contained within the memory 80 and, as such, controls the general operation of the control module and the system(s) it controls.

The memory 80 can be any type of suitable memory. For example, the memory 80 may include various types of dynamic random access memory (DRAM) such as SDRAM, the various types of static RAM (SRAM), and the various types of non-volatile memory (PROM, EPROM, and flash). In certain examples, the memory 80 is located on and/or co-located on the same computer chip as the processor 78. In the depicted embodiment, the memory 80 stores the above-referenced program(s) along with one or more stored values.

The interface 82 may include a component to enable communication with the system 68. The interface 82 may also include a component to enable communication over the CAN bus 24, such as with other modules, systems or components. A high speed CAN transceiver may be used in the interface 82, for communications over the CAN bus 24.

The storage device 84 can be any suitable type of storage apparatus, including direct access storage devices such as hard disk drives, flash systems, floppy disk drives and optical disk drives. In one exemplary embodiment, the storage device 84 comprises a program product from which memory 80 can receive a program that executes one or more embodiments of one or more processes of the present disclosure, such as the steps of the processes 200, 300 (and any sub-processes thereof) described further below in connection with FIGS. 4 and 7. In another exemplary embodiment, the program product may be directly stored in and/or otherwise accessed by the memory 80.

It will be appreciated that the computer system of the control module 70 or of the other control modules described herein, may differ from the embodiment depicted in FIG. 1, for example the computer system of any of the control modules may utilize one or more other control systems, including one or more of the other control modules connected in the CAN 22.

Figure 2:
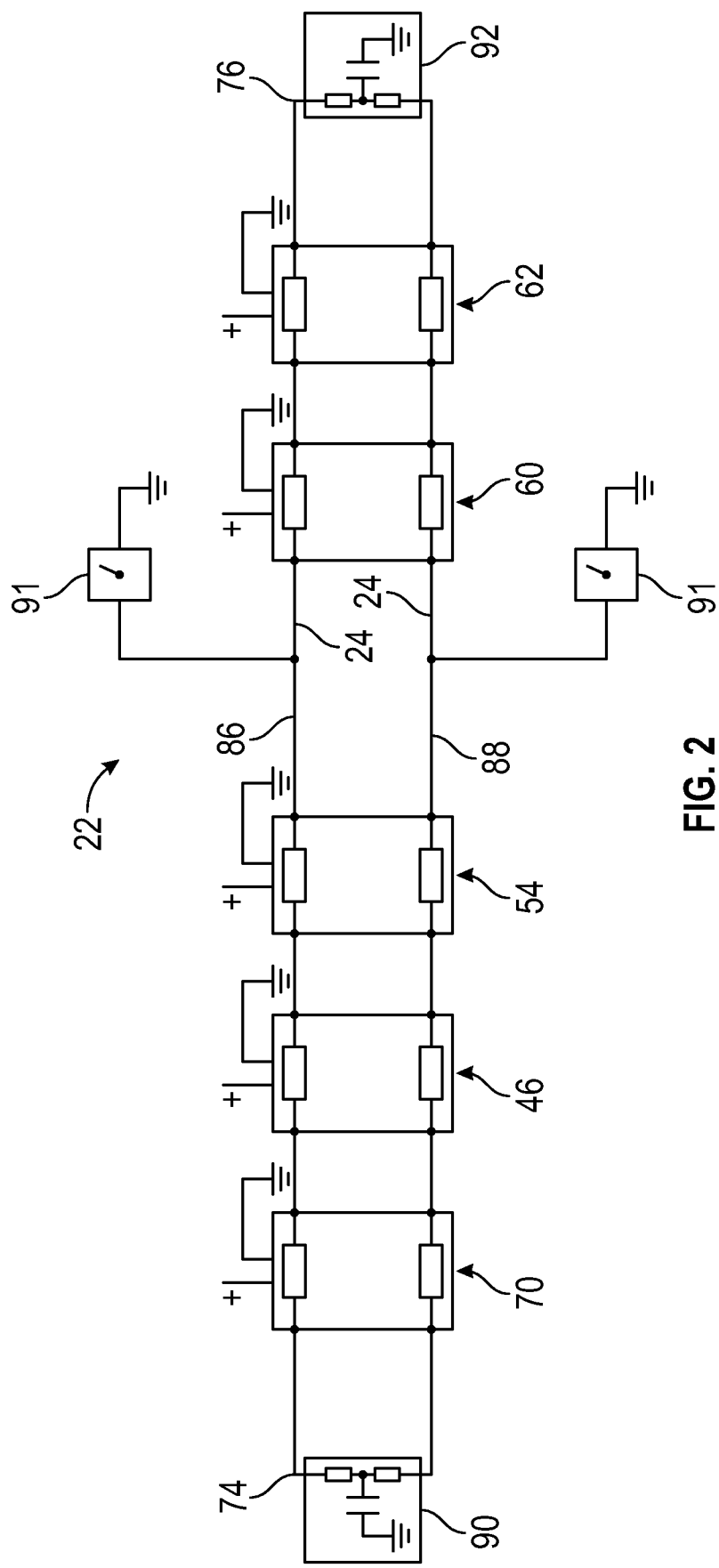
FIG. 2 is a schematic diagram of a CAN, such as used in the vehicle of FIG. 1, in accordance with an exemplary embodiment.

Referring to FIG. 2, a schematic diagram is shown representing a part of the CAN 22 of FIG. 1. The CAN 22 includes a two wire CAN bus 24, which has a higher voltage signal line (CAN-H) 86, and a lower voltage signal line (CAN-L) 88. It should be appreciated that the signal lines 86, 88 may be configured as a twisted pair but are shown separated for clarity. The CAN bus 24 includes a plurality of nodes which are control module 70, steering control module 46, braking control module 54, engine control module 60 and transmission control module 62. Each of the modules is represented as a load with power supply and ground. The ends 74, 76 of the CAN bus 24 may include terminators 90 and 92, respectively, with resistors (R), and capacitor (C). The terminators 90, 92 are configured to match the impedance of the signal lines 86, 88. The terminators 90, 92 may provide a low impedance path to ground for high frequency signals, to minimize signal reflections. Incorrect or lost terminators 90, 92, may result in CAN errors in message waveforms and may result in miscommunications.

Figure 3:
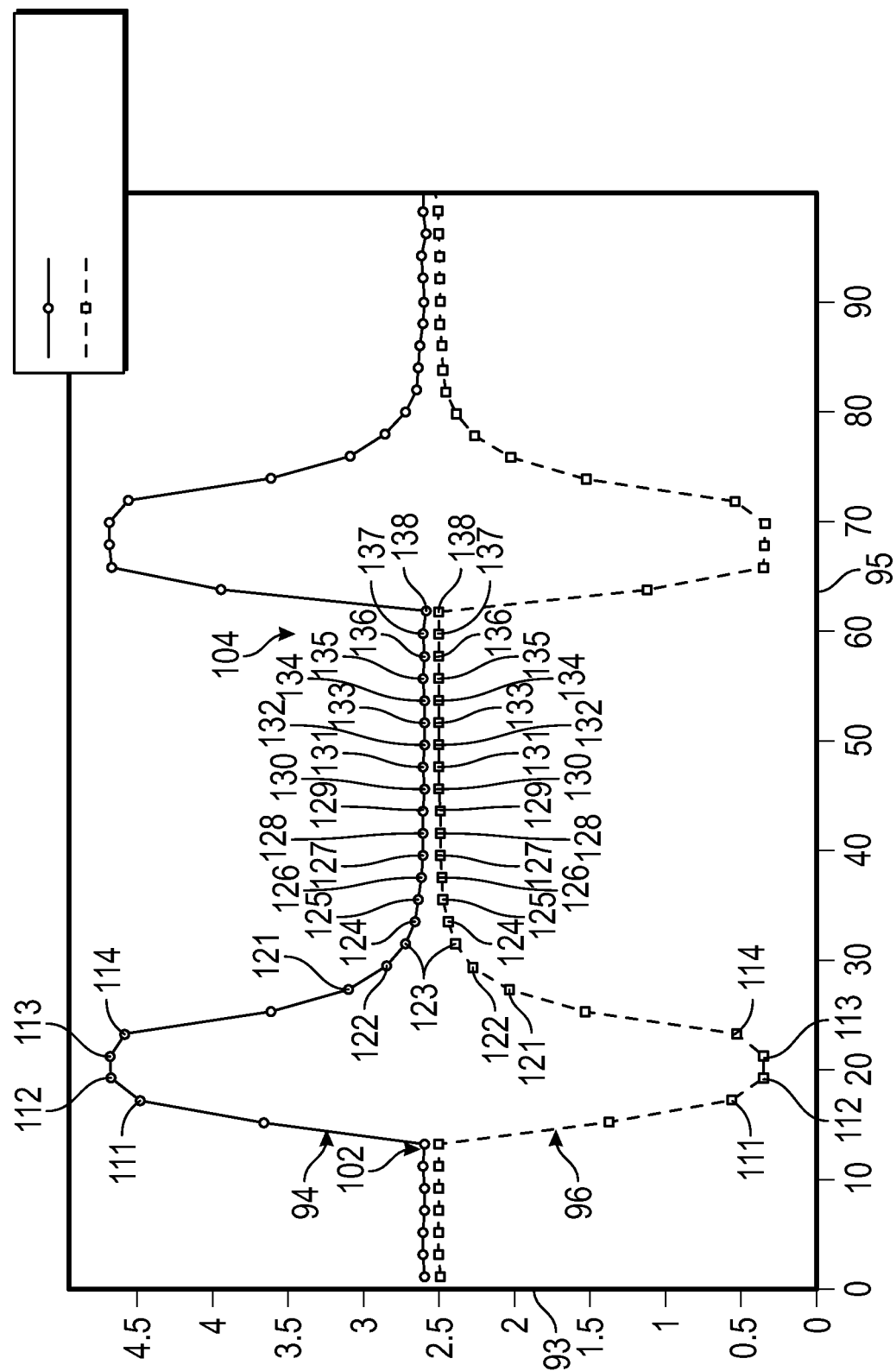
FIG. 3 is a graph of fault signatures depicted as voltage versus time for a CAN in the example of FIG. 2 with terminator loss, in accordance with an exemplary embodiment.

With reference to FIG. 3, fault signatures of terminator loss are demonstrated by voltage levels at the CAN-H 86 and CAN-L 88 signal lines. A terminator loss fault may occur such as through a failure to connect, or reconnect, the terminators 90, 92 with the signal lines 86, 88, or by breaks in the signal lines 86, 88. As shown in FIG. 2, a meter or a voltage sensor or sensors 91 is/are provided in electrical communication with the CAN bus 24. The sensor(s) 91 may be provided as a part of one of the control modules on the CAN 22, part of another unit, or as separate units. The sensor(s) 91 may be connected with, or provided for, each signal line CAN-H 86 and CAN-L 88. The voltage sensor(s) 91 may be connected at the DLC 72 of FIG. 1. The voltage sensor(s) 91 may be included as a component of the CAN 22. The message transmission waveforms are charted with voltage on the vertical axis 93 in volts, and time on the horizontal axis 95 in micro-seconds. Waveform 94 represents the CAN-H voltage and waveform 96 represents the CAN-L voltage. Both the CAN-H waveform 94 and CAN-L waveform 96 start at approximately 2.5 volts. A message transmission begins at time 102 and includes the transmission of 24 bits over a period of approximately 48 microseconds to the time 104. Under the applicable CAN protocol, every dominant bit should shift the CAN-H signal higher to approx. 3.5 volts and at the same time should shift the CAN-L signal down to approximately 1.5 volts for the duration of the communication signal. In the case of FIG. 3, with lost terminators 90, 92, the CAN-H signal rises to approximately 4.7 volts, approaching the level of the logic power voltage, and the CAN-L signal drops to approximately 0.3 volts, approaching the voltage level of ground. After the transmission of four bits, there is a loss of arbitration and both the CAN-H and CAN-L signals return through a slow sloped curve to approximately 2.5 volts for the remainder of the 24 bit transmission. Following point 138, a retransmission occurs and a cycle similar to that between times 102 and 104, repeats. From the data of FIG. 3, fault signatures of the terminator loss can be discerned. These include an excessively high CAN-H voltage, an excessively low CAN-L voltage, a slowly discharging curve from point 112 to point 127, and a repeating periodic pattern. From these observed fault characteristics, a process 200 as shown in FIG. 4 may be used to diagnose a terminator loss fault.

Figure 4:
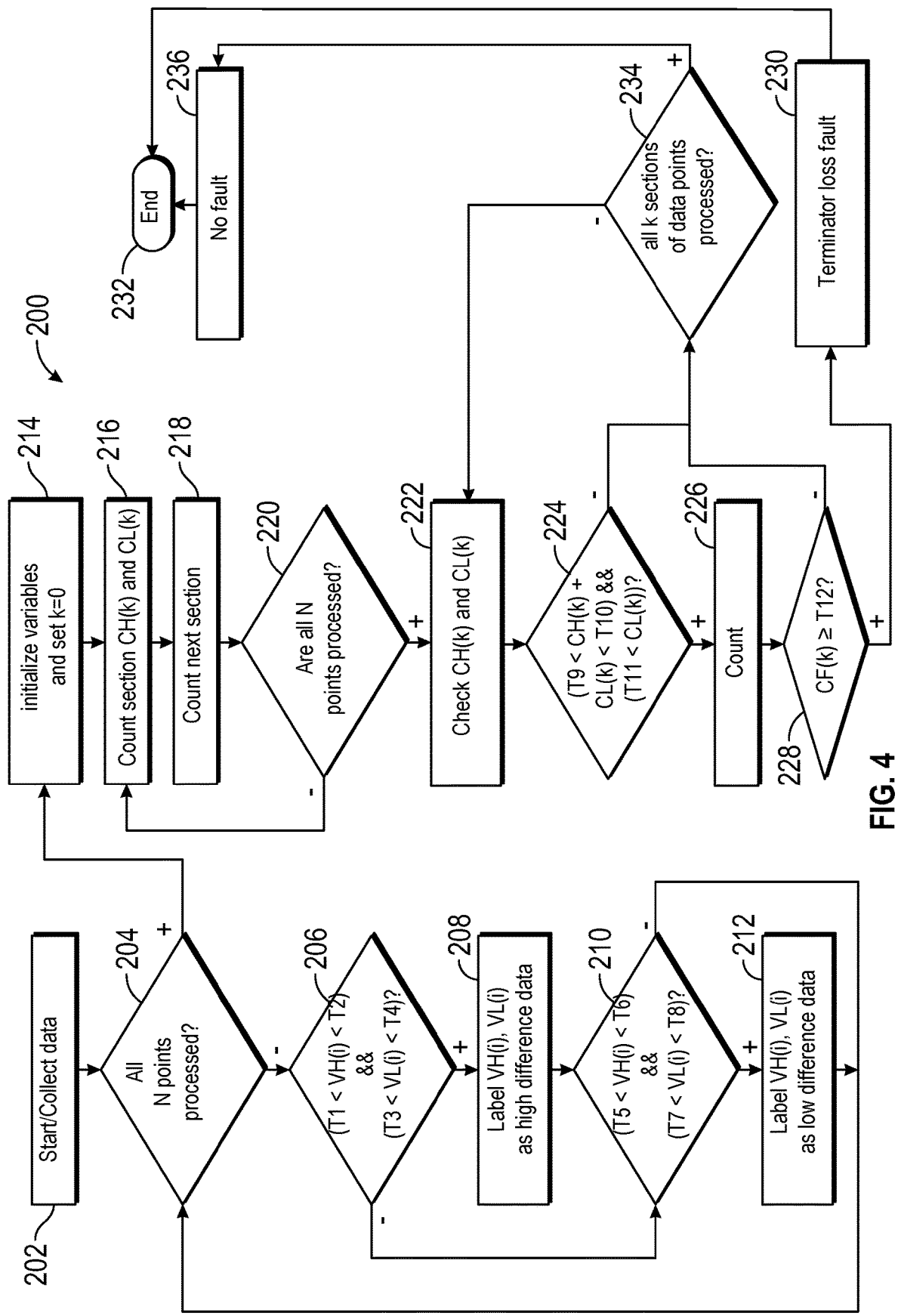
FIG. 4 is a flow chart of methods for fault isolation in accordance with exemplary embodiments.

Referring to FIG. 4, a flowchart of a process 200 for diagnosing a terminator loss fault is shown, in accordance with an exemplary embodiment. The process 200 may be implemented in connection with the vehicle 20 of FIG. 1, including the CAN 22 and other systems, sub-systems, and components thereof, or with other units utilizing a CAN. As depicted in FIG. 4, the process 200 is initiated at step 202. For example, in various embodiments, the process 200 may be initiated when an indication exists that the CAN 22 is not functioning properly. The CAN 22 may experience faults with unidentified sources, or communications may be lost leading to lost messages or improper functions. In one embodiment, the process 200 continues to a determination as to whether a terminator loss exists.

At step 202 a number of data points may be collected with each point representing a set of two simultaneous voltage readings such as collected from the voltage sensors 91. The number of data points collected covers a sufficiently large period of traffic on the CAN bus 24 to provide the level of fidelity needed for the conclusions reached from the process 200. For example, the period may be selected to capture communications with all modules on the CAN bus 24. In the present example, the number of data points is N=1000, where each data point includes a set of voltage readings with a CAN-H voltage reading value and a CAN-L voltage reading value. The two value, data point sets will be referred to herein as data points. Following step 202, the data points are processed to identify high/low differences. For example, data points will be identified where the difference between the CAN-H voltage and the CAN-L voltage is higher than expected or, where the difference between the CAN-H voltage and the CAN-L voltage is lower than expected.

At step 204 the process 200 determines whether all data points have been processed (i.e. whether all 1000 points have been processed). When the determination is negative and additional processing is required, the process 200 proceeds to step 206. At step 206 a determination is made as to whether $(T_1 < V_H(i) < T_2)$ && $(T_3 < V_L(i) < T_4)$? In the determination, $V_H(i)$ and $V_L(i)$ are the CAN-H and CAN-L voltages being evaluated for the data point. In the determination $T_1$-$T_4$ are voltages selected to identify a statistically significant voltage differential. In this example, $T_1$=4 volts, $T_2$=5 volts, $T_3$=0 volts, and $T_4$=1 volt. The two part evaluation is made with the AND operator, where a $V_H(i)$ between 4 and 5 volts, and a $V_L(i)$ between 0 and 1 volt, results in the data point being classified as having a high difference between the CAN-H voltage and the CAN-L voltage. When a positive determination is made, the data set $V_H(i)$, $V_L(i)$ is labeled as a high difference data point at step 208. When the determination is negative at step 206, the data point does not have a high difference and the process 200 proceeds to step 210. Also from step 208, the process 200 proceeds to step 210.

At step 210 a determination is made as to whether $(T_5 < V_H(i) < T_6)$ && $(T_7 < V_L(i) < T_8)$? In the determination, $V_H(i)$ and $V_L(i)$ are the CAN-H and CAN-L voltages being evaluated in the data point. In the determination $T_5$-$T_8$ are voltages selected to identify a statistically significant voltage differential. In this example, $T_5$=2.5 volts, $T_6$=2.9 volts, $T_7$=2.1 volts, and $T_8$=2.5 volts. The evaluations are made with the AND operator where a $V_H(i)$ between 2.5 and 2.9 volts and a $V_L(i)$ between 2.1 and 2.5 volt, results in the data point being classified as having a low difference between the CAN-H voltage and the CAN-L voltage. When such a positive determination is made, the data set $V_H(i)$, $V_L(i)$ is labeled as a low difference data point at step 212. When the determination is negative at step 210, the data point does not have a low difference and the process 200 returns to step 204. Also from step 212, the process 200 returns to step 204. The loop between steps 204 and 210/212 continues until a determination is made at step 204 that all 1000 data points have been processed. Upon a positive determination at step 204 that all data points have been processed, the process 200 proceeds to step 214.

The process may arrive at step 214 with an identified set of data points that have a high difference and an identified set of data points that have a low difference. These two sets will then be processed to identify the number of sections in the N data points collected that indicate a terminator loss fault. A section of the 1000 point sample is equal to 24 bits, which as shown in FIG. 3, is the number of data points between time 102 and time 104 (i.e. one period of the periodic waveforms). It should be noted that time 104 corresponds to point 138. The variables are initialized at step 214 and k is set to zero. k is one section of traffic on the CAN bus 24 equal to one period. At step 216 the process 200 begins counting the number of points labeled high difference $C_H(k)$ and the number of points labeled low difference $C_L(k)$ in each section. For example, in FIG. 3, the section from time 102 to time 104 has four points 111-114, with a high difference, as identified at step 208. In the same section between times 102 and 104, there are 18 points 121-138, with a low difference as identified at step 212. From step 216, the process proceeds to step 218 and the counting moves to the next section of the waveforms 94, 96. At step 220, a determination is made as to whether all data points for all sections of the 1000 point sample have been processed. If the determination is negative and all points have not been processed, the process 200 returns to step 216 and the next section is counted. When the determination at step 220 is positive, and all N data points have been processed for all sections, the process 200 proceeds to step 222.

At step 222, the process 200 recalls the number of points labeled high difference $C_H(k)$ in step 208, and the number of points labeled low difference $C_L(k)$ in step 212, for the first section k. At step 224, a determination is made as to whether $(T_9 < C_H(k) + C_L(k) < T_{10})$ && $(T_{11} < C_L(k))$? As stated above for the exemplary section, $C_H(k)$ is 4 data points, and $C_L(k)$ is 18 data points, so, $C_H(k) + C_L(k)$ equals 22. In the determination $T_9 = 20$, $T_{10} = 28$, and $T_{11} = 12$, each of which is derived from the signature of the waveforms of FIG. 3. Because the number 22 is between 20 ($T_9$) and 28 ($T_{10}$), and the number 18 is greater than 12 ($T_{11}$), the exemplary section results in a positive determination at step 224. The process 200 proceeds to step 226 and the positive outcome case from step 224 is counted. The process 200 proceeds to step 228, and a determination is made as to whether $C_F(k) \geq T_{12}$? $C_F(k)$ is the number of sections counted that resulted in positive determinations at step 224. $T_{12}$ is a sampling rate dependent number. In this example, a sample of 1000 data points is used, with 24 data points in each section, meaning the sample is 41⅔ sections. $T_{12} = 10$ is used in this example. Assuming for purposes of example, 15 sections out of the 41⅔ sections sampled were counted at step 226, $C_F(k)$ equals 15. Since 15 is greater than 10, the determination at step 228 is positive and the process 200 proceeds to step 230, where a terminator loss fault is reported. The process then ends at step 232.

Returning to step 224, when the determination is negative, the process 200 proceeds to step 234 where a determination is made as to whether all k sections of data points have been processed. When the determination is negative, the process 200 returns to step 222 and the remaining sections of data points are processed. When the determination at step 234 is positive, meaning all sections of data have been processed, and when the determination at step 228 is negative, meaning the number of sections with positive determinations at step 224 is less than $T_{12}$, then the process proceeds to step 236 and a no fault outcome is reported. The process then ends at step 232. The process 200, determines the existence or absence of a fault using a physics based approach. To make the determination, CAN bus voltage measurements of message traffic on the CAN bus 24 is used to determine whether a fault signature is present.

Figure 5:
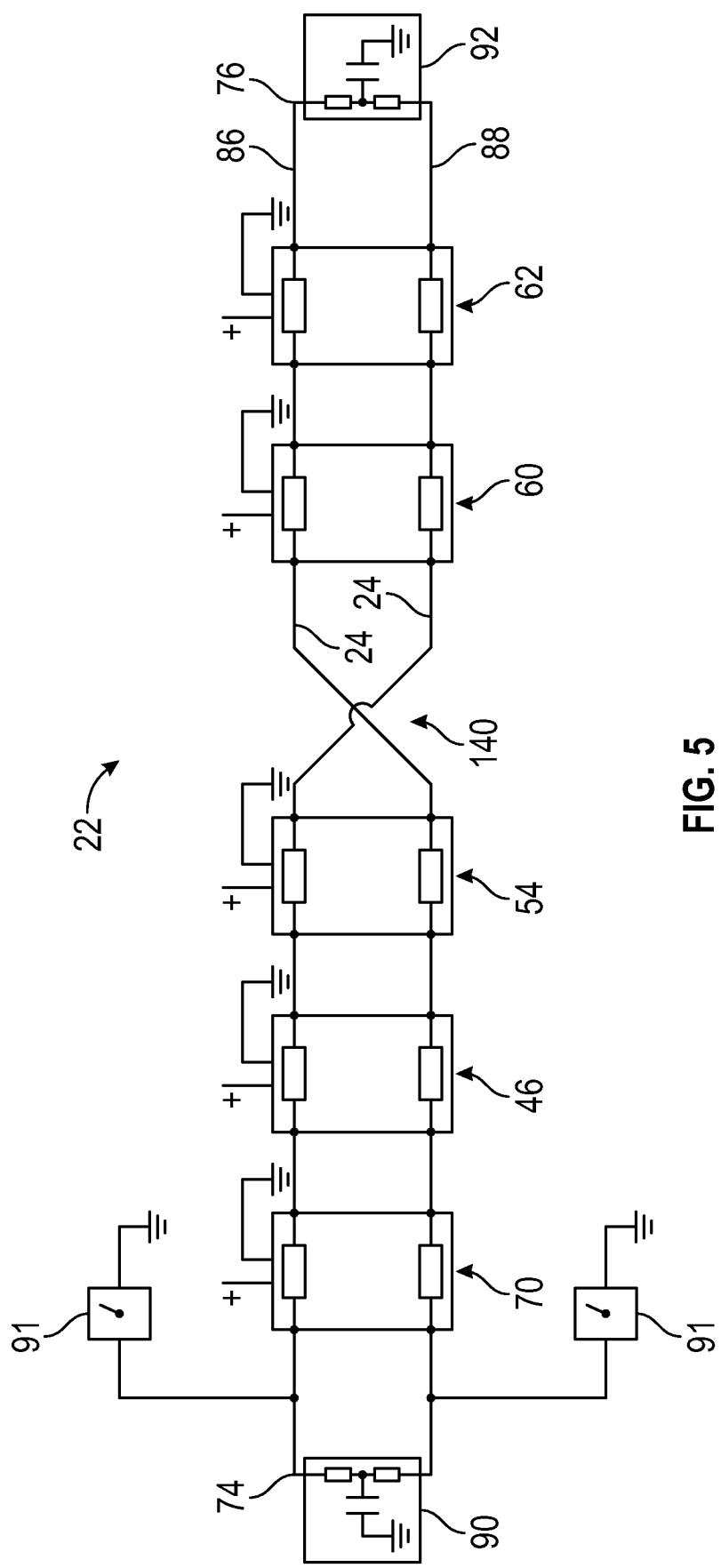
FIG. 5 is a schematic diagram of a CAN, such as used in the vehicle of FIG. 1, with a crossed wire fault.
Figure 6:
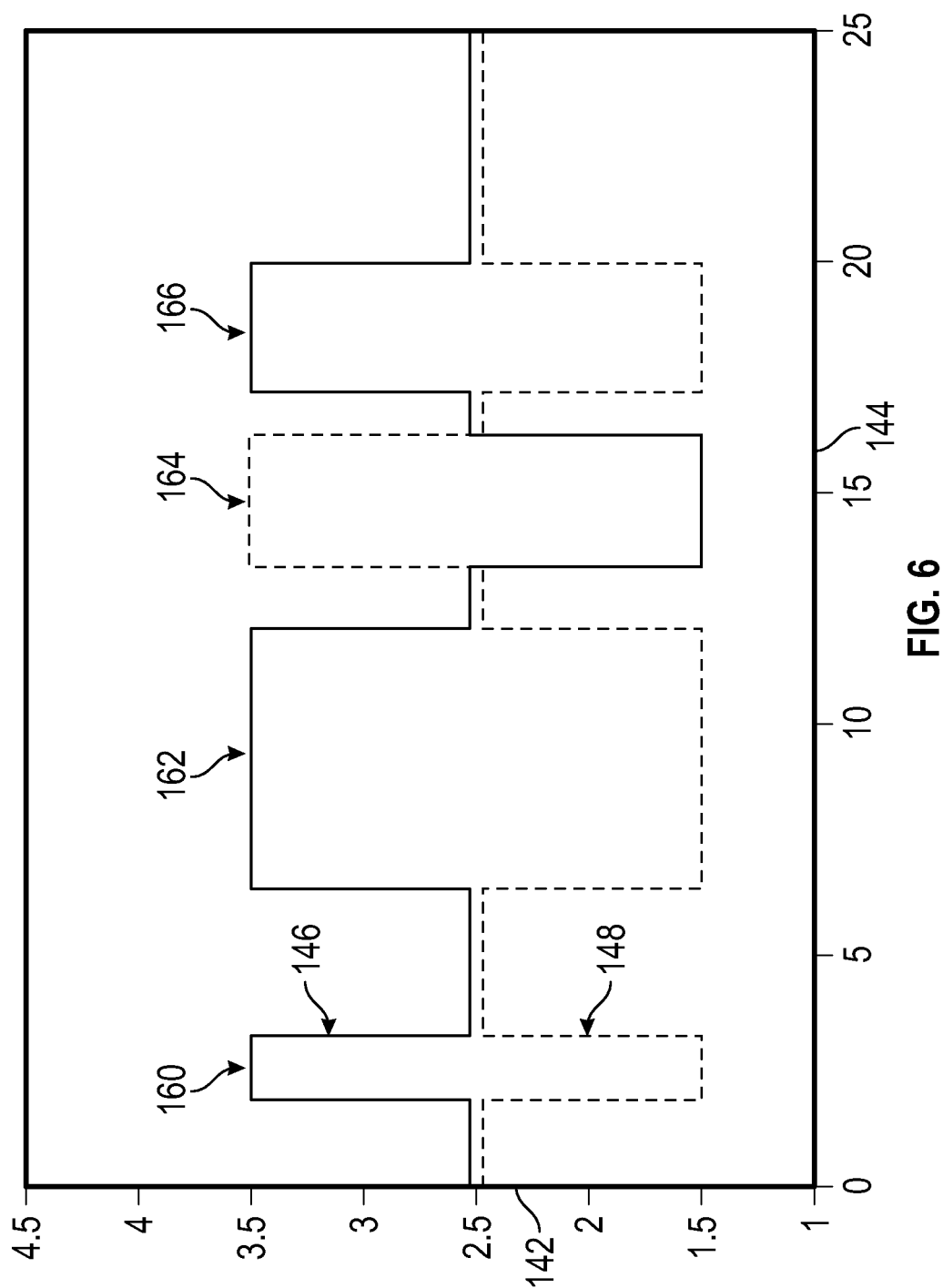
FIG. 6 is a graph of fault signatures depicted as voltage versus time for a CAN in the example of FIG. 5, in accordance with an exemplary embodiment.
Figure 7:
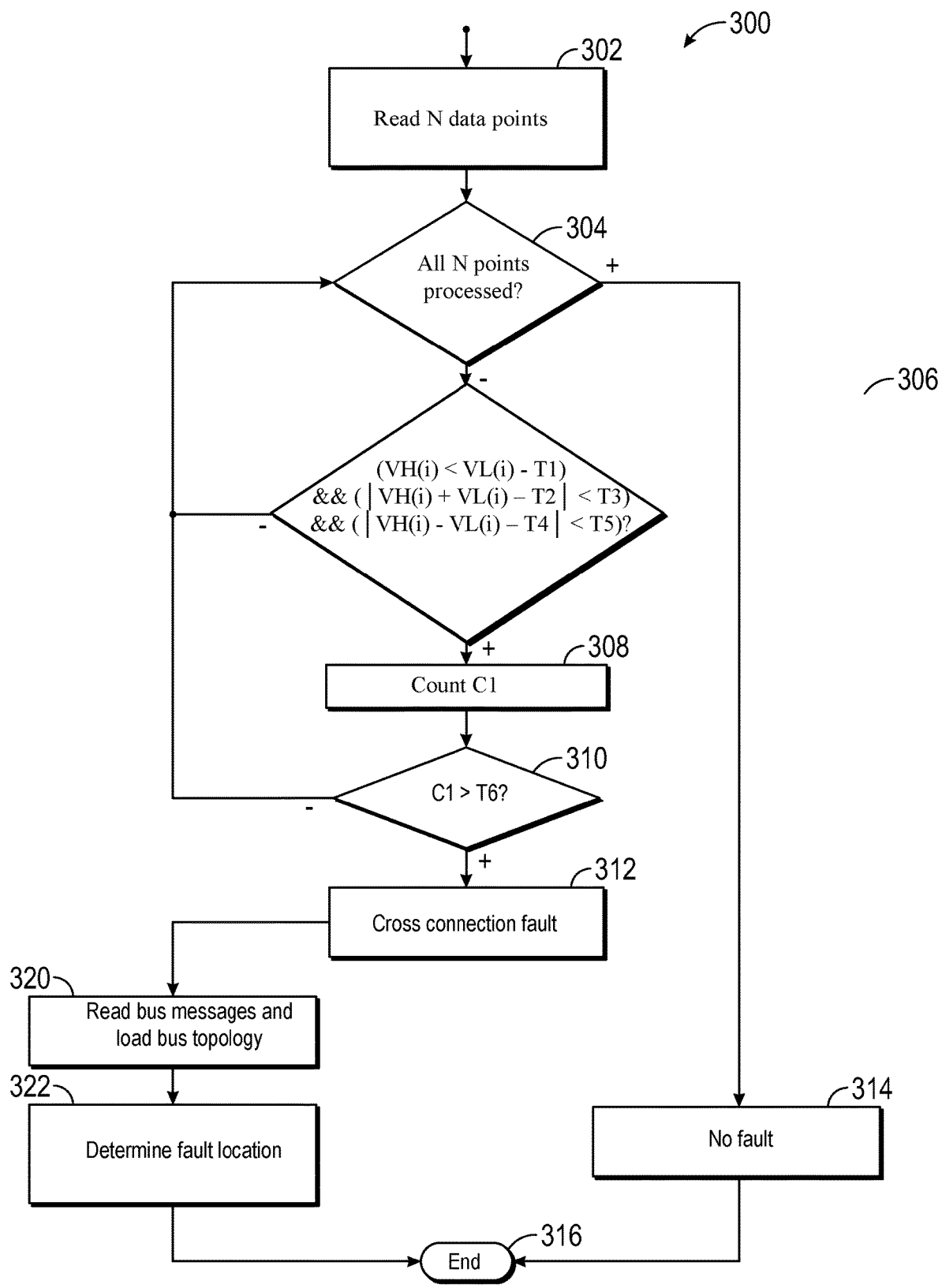
FIG. 7 is a flow chart of methods for fault isolation in accordance with exemplary embodiments.

Another exemplary embodiment of a physics based approach to isolate a fault in a CAN using voltage measurements is demonstrated with reference to FIGS. 5-7. Referring to FIG. 5, a schematic diagram is shown representing a part of the CAN 22 of FIG. 1. The CAN 22 includes a two wire CAN bus 24, which has a higher voltage signal line (CAN-H) 86, and a lower voltage signal line (CAN-L) 88. It should be appreciated that the signal lines 86, 88 may be configured as a twisted pair but are shown separated for clarity. The CAN bus 24 includes a plurality of nodes which include the control module 70, the steering control module 46, the braking control module 54, the engine control module 60, and the transmission control module 62. Each of the modules is represented as a load with a power supply and a ground. The ends 74, 76 of the CAN bus 24 may include terminators 90 and 92, respectively, with resistors (R), and capacitor (C). A crossed wire, such as illustrated by the crossed connection 140, between the signal lines 86, 88 may occur if the signal wires are connected incorrectly. The crossed connection 140 may occur at a connection between a module and the CAN bus 24, or in the connection of the signal lines 86, 88. In a crossed connection 140 situation, miscommunication may occur.

With reference to FIG. 6, fault signatures of the crossed connection 140 are demonstrated by voltage levels at the CAN-H 86 and CAN-L 88 signal lines. A meter or voltage sensor(s) 91 may be connected with each signal line CAN-H 86 and CAN-L 88, as shown in FIG. 5. In a number of examples, the voltage sensor (s0 may be connected at the DLC 72, or at another location. Alternatively, the voltage sensor(s) may be provided as a component of the CAN 24. In FIG. 6, message transmission waveforms are charted as voltage on the vertical axis 142 in volts, and time on the horizontal axis 144 in micro-seconds. Waveform 146 represents the CAN-H voltage and waveform 148 represents the CAN-L voltage. Both CAN-H waveform 146 and the CAN-L waveform 148 start at approximately 2.5 volts. Under the applicable CAN protocol, during message transmission every dominant bit should shift the CAN-H signal higher to approx. 3.5 volts and at the same time should shift the CAN-L signal down to approximately 1.5 volts for the duration of the communication signal. In the case of FIG. 6, with a crossed connection 140, the CAN-H signal rises to approximately 3.5 volts, and the CAN-L signal drops to approximately 1.5 volts, for the message transmissions 160, 162 and 166. For the message transmission 164 the CAN-H signal drops to approximately 1.5 volts, and the CAN-L signal rises to approximately 3.5 volts. The message transmission 164 does not correspond to a dominate state for the CAN-H signal. From the data of FIG. 6, fault signatures of the crossed connection 140 are discerned. These include an excessively low CAN-H voltage compared to the CAN-L voltage, and other CAN protocols such as timing, message content and signal response are followed. From these observed fault characteristics, a process 300 as shown in FIG. 7 may be used to diagnose a crossed connection fault.

FIG. 7 is a flowchart of a process 300 for diagnosing a crossed connection fault, in accordance with an exemplary embodiment. The process 300 can be implemented in connection with the vehicle 20 of FIG. 1, including the CAN 22 and other systems, sub-systems, and components thereof, or with any other unit that uses a CAN. As depicted in FIG. 7, the process 300 is initiated at step 302. For example, in various embodiments, the process 300 may be initiated when the CAN 22 is not functioning properly. The CAN 22 may experience faults with unidentified sources, or communications may be lost leading to lost messages or improper functions. In one embodiment, the process 300 continues throughout a determination as to whether a crossed connection fault exists.

At step 302 a number N of data points may be collected with each point representing a set of two simultaneous voltage readings such as collected from the voltage sensors 91. The number of data points collected covers a sufficiently large period of message traffic on the CAN bus 24 to provide the level of fidelity needed for the conclusions reached from the process 300. For example, the period may be selected to capture communications on the CAN bus 24 with the normal frame of message transmissions 160, 162 and/or 166, and the reversed frame of message transmission 164. In the present example, the number of data points is N=500, where each of the 500 data points includes a set with a CAN-H voltage reading and a CAN-L voltage reading. Following step 302, the data points are processed to identify low CAN-H voltages. For example, data points are identified where the CAN-H voltage is significantly lower than the CAN-L voltage.

At step 304 a determination may be made as to whether all data points have been processed (i.e. whether all N points have been processed). When the determination is negative and additional processing is required, the process 300 proceeds to step 306. At step 306 a determination is made as to whether $(V_H(i) < V_L(i) - T_1)$ && $(|V_H(i) + V_L(i) - T_2| < T_3)$ && $(|V_H(i) - V_L(i) - T_4| < T_5)$? In the determination, $V_H(i)$ and $V_L(i)$ are the CAN-H and CAN-L voltages being evaluated in the data point. In the determination, $T_1$-$T_5$ are voltages selected to identify a statistically significant voltage comparison. In this example, $T_1$=1 volt, $T_2$=5 volts, $T_3$=0.5 volts, $T_4$=2 volts, and $T_5$ is 0.5 volts. $T_1$, $T_2$ and $T_4$ are derived from the CAN protocol, where the $T_1$ value of 1 is to distinguish from equal recessive voltages of CAN-H and CAN-L. The $T_2$ value equals the signal voltage, which is 5. It should be noted that CANH+CANL is always 5V whether dominant or recessive bit. The $T_4$ value of 2 comes from the dominate difference between the voltages of 3.5V and 1.5V. In addition, $T_3$ and $T_5$ are selected as small values. The three evaluations of step 306 are made with AND operators. The question $V_H(i) < V_L(i) - T_1$? is evaluated to identify whether $V_H$ is significantly lower than $V_L$. The question $|V_H(i) + V_L(i) - T_2| < T_3$? is evaluated to determine whether the sum of the $V_H$ and $V_L$ voltages is consistent with the signal voltage. The question $|V_H(i) - V_L(i) - T_4| < T_5$? is evaluated to determine whether the difference between $V_H$ and $V_L$ is consistent with the expected difference at a dominant state. When a positive determination is made at step 306, the process 300 proceeds to step 308 and a count C1 of the positive determination is registered. When the determination is negative at step 306, the data point is not counted and the process 300 returns to step 304. From step 308, the process 300 proceeds to step 310.

At step 310 a determination is made as to whether $C1 > T_6$ where C1 is the counter total, and $T_6$ is a number of positive determinations counted that is a statistically significant portion of the sample. In one embodiment, a determination is made as to whether there are ten positive determinations out of the 500 data point sample. If the determination is negative at step 310, the process 300 returns to step 304 for processing additional data points. When the determination at step 310 is positive, meaning greater than 10 positive determinations have been made at step 306, the process 300 proceeds to step 312. At step 312 a crossed connection fault is reported, and the process 300 may end. Returning to step 304, when all data points have been processed, and a positive determination has been made at step 310, the process 300 proceeds to step 314 where the absence of a crossed connection fault is reported, and the process 300 ends at step 316.

In a number of examples, when a reversed connection fault is reported at step 312, the process 300 may proceed to a fault location determination. In a number of examples, the process 300 may continue to determine the fault location at step 320. Messages on the CAN bus 24 may be read and the topology of the CAN bus 24 may be referenced. At step 322 the location of the crossed connection fault may be determined using a topology-based approach. For example, a predetermined time window of messages on the CAN bus 24 may be monitored for determining whether occurrences of a first short-lived fault and a second short-lived fault exist. A first fault set including at least one inactive controller associated with the first short-Jived fault and a second fault set including at least one inactive controller associated with the second short-lived fault may be identified. An intermittent fault may be located in the CAN based upon the first and second fault sets. Once the location of the fault is determined, the process 200 may end at step 216.

Accordingly, methods, systems, and vehicles are provided for determining whether a terminator loss fault or a crossed wire fault has occurred in a CAN bus 24. Either a terminator loss fault or a crossed wire fault is considered a connection error. The disclosed methods, systems, and vehicle provide efficient options for diagnosing a connection error in a CAN system. It will be appreciated that the disclosed methods, systems, and vehicle may vary from those depicted in the Figures and described herein. For example, the vehicle 20, the CAN 22, and/or various components thereof may vary from that depicted in FIG. 1, and described in connection therewith. In addition, it will be appreciated that certain steps and/or implementations of the processes 200, 300 may vary from those depicted in FIGS. 4 and 7 and/or described above in connection therewith. It will similarly be appreciated that certain steps of the methods described above may occur simultaneously or in a different order than that depicted in FIGS. 4 and 7 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method for evaluating a controller area network (CAN) comprising a CAN bus and a plurality of modules configured to communicate over the CAN bus, the method comprising:
   providing a voltage sensor in electrical communication with the CAN bus;
   reading a number of pairs (N pair) of voltages, each pair comprising a CAN high (CAN-H) value and a CAN low (CAN-L) value; and
   processing the N pair of voltages through a comparison of the CAN-H values and the CAN-L values; and
   determining from the processing, whether a fault signature is present in the CAN-H and CAN-L values,
   wherein the fault signature comprises at least one of a terminator loss fault and a crossed connection fault, where a terminator loss fault indicates a terminator is not connected to the CAN bus, and where a cross connection fault indicates a cross connection of at least one of a CAN-H signal line and a CAN-L signal line, and/or one of the plurality of modules.

2. The method of claim 1, comprising:
   selecting a voltage value equal to a signal voltage level of the CAN bus; and
   comparing the CAN-H value and the CAN-L value to the voltage value.

3. The method of claim 1, comprising:
   determining the fault signature by evaluating a waveform of communication signals on the CAN bus.

4. The method of claim 1, comprising:
   determining a voltage magnitude where, when the CAN-H value is less than a difference between the CAN-L value and the voltage magnitude, the crossed connection fault is indicated; and
   evaluating whether the CAN-H value is less than the difference between the CAN-L value and the voltage magnitude.

5. The method of claim 1, comprising:
   determining a difference between the CAN-H and CAN-L values; and evaluating a magnitude of the difference to determine whether the fault signature indicates the terminator loss fault.

6. The method of claim 1, comprising:
   evaluating whether a difference between the CAN-H value and the CAN-L value is greater than a first threshold; and
   evaluating whether the difference between the CAN-H value and the CAN-L value is less than a second threshold.

7. The method of claim 1, comprising:
   determining a number of occurrences which when present in the N pair of voltages, indicates the existence of the fault signature; and
   evaluating whether the number of occurrences is present in the N pair of voltages.

8. The method of claim 1, comprising:
   selecting a first voltage value equal to a signal voltage of the CAN bus;
   selecting a second voltage value that is less than one volt; and
   subtracting the first voltage value from a sum of the CAN-H value and the CAN-L value to arrive at an amount; and
   evaluating whether an absolute value of the amount is less than the second voltage value.

9. The method of claim 1, comprising:
   providing a vehicle; and
   using the CAN to control a part of the vehicle.

10. The method of claim 1 wherein a select one of the plurality of modules is identified as a source of the crossed connection fault by:
    monitoring, for a predetermined time window, messages on the CAN bus;
    determining whether occurrences of a first intermittent fault and a second intermittent fault exist;
    reading a topology of the CAN bus; and
    identifying, when the first and second intermittent faults exist, the select one of the plurality of modules that is the source of the crossed connection fault.

11. A method for evaluating a controller area network (CAN) comprising a CAN bus and a plurality of modules configured to communicate over the CAN bus, the method comprising:
    determining a fault signature indicative of a connection error in the CAN;
    providing a voltage sensor in electrical communication with the CAN bus;
    reading a number of pairs (N pair) of voltages from the CAN bus, each pair comprising a CAN high (CAN-H) value and a CAN low (CAN-L) value;
    processing the N pair of voltages through a comparison of the CAN-H values and the CAN-L values; and
    determining from the processing, whether the fault signature is present in the CAN-H and CAN-L values,
    wherein the fault signature comprises at least one of a terminator loss fault and a crossed connection fault, where a terminator loss fault indicates a terminator is not connected to the CAN, and where a cross connection fault indicates at least one of a cross connection of at least one of a CAN-H signal line and a CAN-L signal line, and/or one of the plurality of modules.

12. The method of claim 11, comprising:
    selecting a voltage value equal to an operating signal voltage level of the CAN bus; and
    comparing the CAN-H value and the CAN-L value to the voltage value.

13. The method of claim 11, comprising:
    determining the fault signature by evaluating a waveform of communication signals on the CAN bus.

14. The method of claim 11, comprising:
    determining a voltage magnitude where, when the CAN-H value is less than the difference between the CAN-L value and the voltage magnitude, a crossed connection fault is indicated; and
    evaluating whether the CAN-H value is less than a difference between the CAN-L value and the voltage magnitude.

15. The method of claim 11, comprising:
    providing a terminator at each of first and second ends of the CAN bus;
    determining a difference between the CAN-H and CAN-L values; and evaluating a magnitude of the difference to determine whether the fault signature indicates a loss of the terminators.

16. The method of claim 11, comprising:
    evaluating whether a difference between the CAN-H value and the CAN-L value is greater than a first threshold; and
    evaluating whether the difference between the CAN-H value and the CAN-L value is less than a second threshold.

17. The method of claim 11, comprising:
determining a number of occurrences which when present in the N pair of voltages indicates the existence of the fault signature; and
evaluating whether the number of occurrences is present in the N pair of voltages.

18. The method of claim 11, comprising:
selecting a first voltage value equal to an operating signal voltage of the CAN bus;
selecting a second voltage value that is less than one volt;
subtracting the first voltage value from a sum of the CAN-H value and the CAN-L value to arrive at an amount; and
evaluating whether an absolute value of the amount is less than the second voltage value.

19. The method of claim 18 comprising:
selecting a third voltage value equal to a difference between a dominant state CAN-H voltage and CAN-L voltage;
selecting a fourth voltage value that is less than one volt;
subtracting the CAN-L value and the third voltage value from the CAN-H value to arrive at a second amount; and
evaluating whether an absolute value of the second amount is less than the fourth voltage value.

20. A method for evaluating a controller area network (CAN) of a vehicle comprising a CAN bus and a plurality of modules configured to communicate over the CAN bus, the method comprising:
configuring the modules to control functions of the vehicle;
determining that a fault exists in the CAN;
determining a fault signature indicative of a connection error in the CAN;
providing a voltage sensor in electrical communication with the CAN bus;
reading a number of pairs (N pair) of voltages from the CAN bus, each pair comprising a CAN high (CAN-H) value and a CAN low (CAN-L) value;
processing the N pair of voltages through a comparison of the CAN-H values and the CAN-L values;
determining from the processing, whether the fault signature is present in the CAN-H and CAN-L values;
when the fault signature is present, isolating the fault based on the fault signature including by:
monitoring, for a predetermined time window, messages on the CAN bus;
determining whether occurrences of a first intermittent fault and a second intermittent fault exist;
reading a topology of the CAN bus; and
identifying, when the first and second intermittent faults exist, the select one of the plurality of modules that is the source of the crossed connection fault.

* * * * *